Nov. 27, 1951     O. A. LABUS     2,576,905
ADJUSTABLE AIR DISTRIBUTOR

Filed March 26, 1948     2 SHEETS—SHEET 1

INVENTOR.
*OTTO A. LABUS*
BY *Holmes + Andersen*
ATTORNEYS

Nov. 27, 1951  O. A. LABUS  2,576,905
ADJUSTABLE AIR DISTRIBUTOR
Filed March 26, 1948  2 SHEETS—SHEET 2

INVENTOR.
OTTO A. LABUS
BY Holmes & Andersen
ATTORNEYS

Patented Nov. 27, 1951

2,576,905

UNITED STATES PATENT OFFICE 2,576,905

ADJUSTABLE AIR DISTRIBUTOR

Otto A. Labus, La Crosse, Wis., assignor to The Trane Company, La Crosse, Wis.

Application March 26, 1948, Serial No. 17,221

8 Claims. (Cl. 98—40)

This invention relates to a distributor for a stream of moving air or gas, and it is particularly adapted for mounting either on a unit heater or on a duct emitting conditioned air or gas.

An object of the invention is to provide a distributor which may be adjusted to vary the amount of deflection of an air or gas stream.

Another object of the invention is to provide a distributor which may be adjusted to give different angles of deflection of the air or gas at different points around the axis of the air or gas stream, which allows the cross-sectional shape of the discharged stream to be controlled as desired.

Another object is to provide a distributor which is simple and inexpensive to manufacture and which satisfies the requirements of good air distribution.

Another object of the invention is to provide a distributor which is particularly adapted for use with a fluid stream flowing from a propeller fan, because it changes the normal spiral movement of the stream into a substantially straight line flow and in this way increases the distance that the fan throws the fluid.

Further objects of the invention will become apparent from the following specification taken in connection with the drawings which form a part of this application, and in which.

Figure 1:
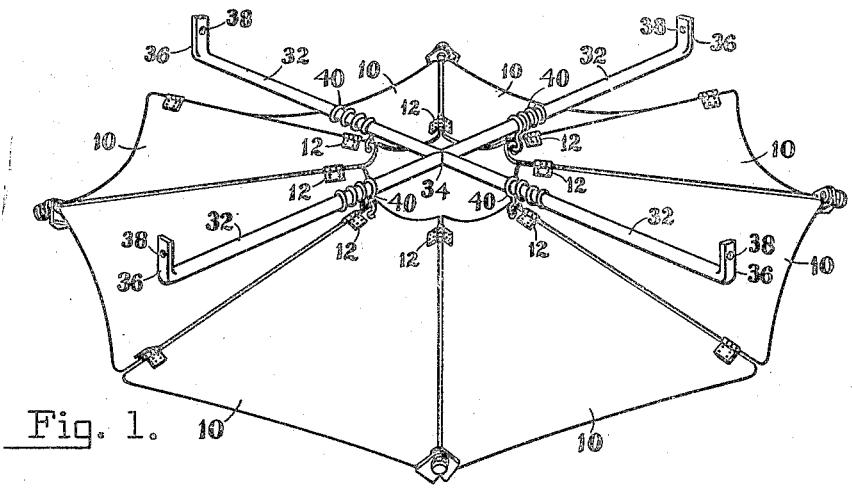
Fig. 1 is a perspective view of my distributor adjusted for equal deflection of the air in all sectors of the air stream.
Figure 2:
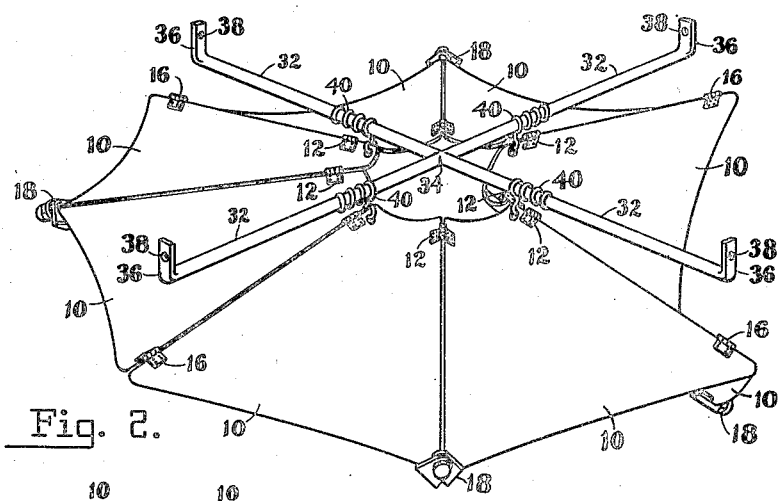
Fig. 2 is a perspective view of my distributor adjusted for unequal deflection of different sectors of the air stream.
Figure 3:
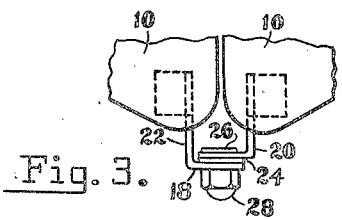
Fig. 3 is a plan view of a hinge of the distributor.
Figure 4:
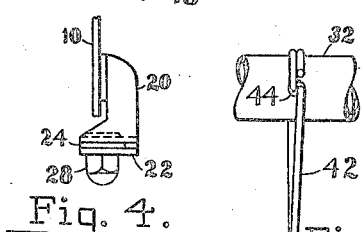
Fig. 4 is a side view of the hinge of Fig. 3.

Referring to the drawings, the distributor has eight vanes 10 which have generally the shape of a portion of the surface of a truncated cone with their longitudinal edges corresponding generally with an element of the cone. In the completely assembled distributor the vanes 10 present a concave surface as viewed from above. The vanes 10 are pivotally connected at their inner ends by hinges 12 which are spot welded to the vanes 10. The vanes 10 are pivotally connected at their outer ends. Half of the connections at the outer ends are hinges 16 spot welded to the vanes 10 and alternate connections at the outer ends are hinges 18 also spot welded to the vanes.

Hinge 18 is shown on an enlarged scale in Figs. 3–6 and has an angle member 20 spot welded to a vane 10, and an angle member 22 spot welded to another vane 10. There is a washer 24 between flanges of angle members 20 and 22, and a threaded bolt 26 is spot welded to angle member 20 and has its threaded portion extending through holes in members 20, 22, and 24. Threaded on the end of bolt 26 is a nut 28 which may be loosened in order to adjust the vanes, and tightened in order to hold them securely in adjusted position.

The distributor has a cross-shaped support member 30. The member 30 is made up from four pieces of pipe 32 welded together at 34 and having upturned flattened ends 36 each having a hole 38 therein to facilitate fastening the distributor to a duct or the frame of a unit heater.

The support member 30 has four hangers 40. Each hanger 40 has a coil portion of a diameter such that it fits loosely on the pipes 32 of the support 30 and a closed hook portion extending through holes in adjacent sides of two adjacent vanes as clearly shown in the drawings.

Figures 7, 8:
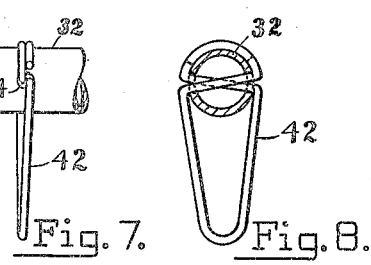
Fig. 7 is a plan view of a modified form of coupling.
Fig. 8 is a side view of the modified coupling of Fig. 7.
Figure 5:
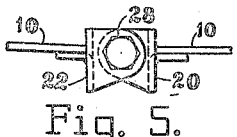
Fig. 5 is an end view of the hinge of Figs. 3 and 4.
Figure 6:
Fig. 6 is an end view of another adjustment of the hinge shown in Fig. 3.
Figure 9:
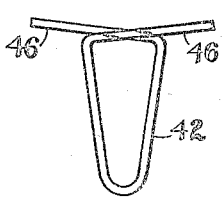
Fig. 9 shows the coupling of Figs. 7 and 8 prior to its assembly in the distributor.
Figure 10:
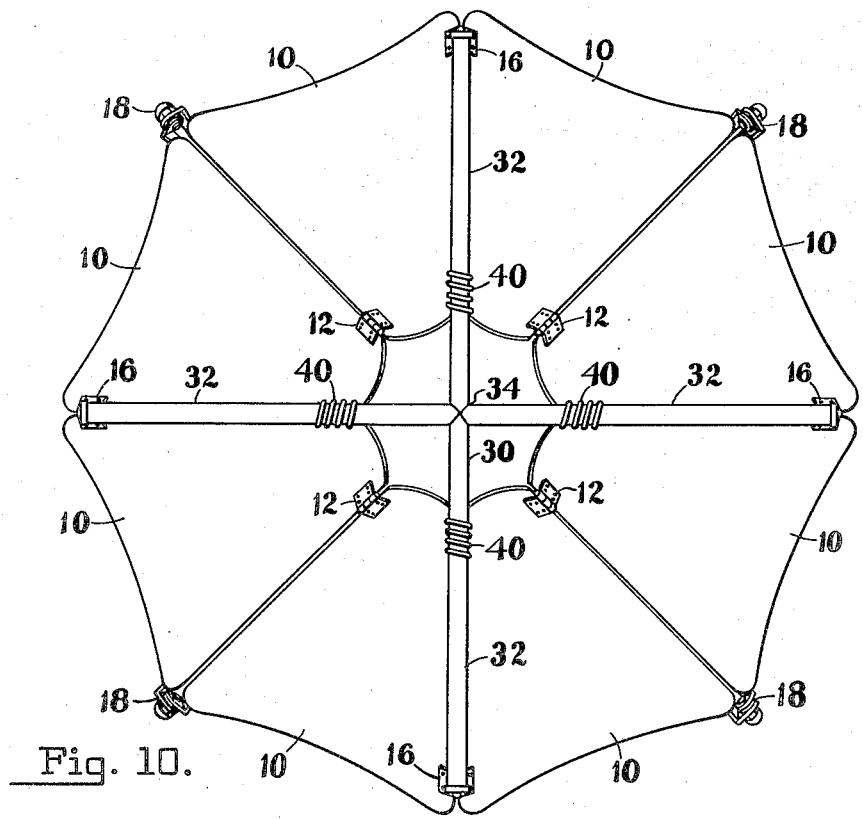
Fig. 10 is a plan view of the distributor.
Figure 11:
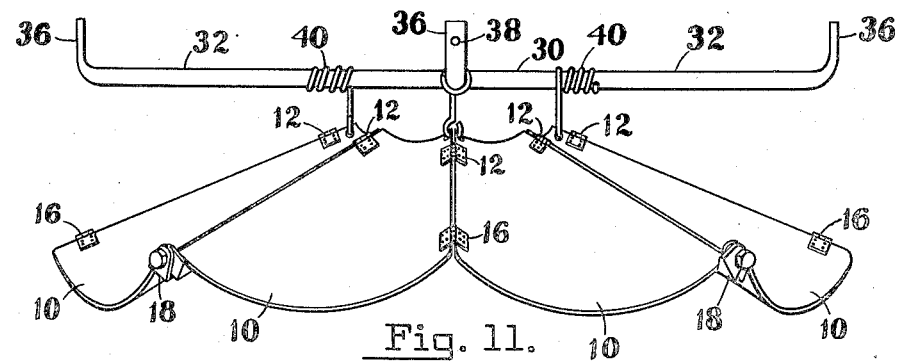
Fig. 11 is a side view of the distributor.

Figs. 7, 8, and 9 show a modified hanger 42 which can be used in place of the hanger 40 shown in Figs. 1, 2, 10, and 11. The lower loop portion of hanger 42 extends through holes in adjacent sides of adjacent vane members in substantially the same manner as hanger 40. In this form the pipes 32 each have a hole 44 therethrough. The hanger 42 has end portions 46 which are placed in the hole 44 so that they extend in opposite directions and the ends of end portions 46 are then bent up over the top of pipe 32 as clearly shown in Figs. 7 and 8.

Figure 12:
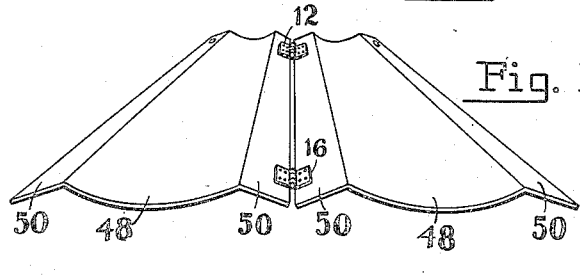
Fig. 12 is a side view showing a modification of the vane.

Fig. 12 shows a modified vane 48 which may be used in place of the vane 10 of Figs. 1–16, 10 and 11. The vane 48 has flanges 50 which are bent out of the generally conical shape of vane as clearly shown in the drawing. The flanges 50 have a progressively decreasing width from the outer edge to the peak of the diffuser. The advantage of the vane 48 over the vane 10 is that a distributor having vanes 48 can be adjusted to a smaller cone angle before the vanes interfere with each other at their longitudinal edges.

My distributor, with the vanes 10, may be adjusted to a position at which the cone angle is small and the surfaces of the vanes are almost vertical. This adjustment is made by loosening the nuts 28 and lowering the hinges 18 and the edges of the vanes 10 connected thereby. The edges of the vanes 10 which are connected by hinges 16 will swing downwardly about the closed hook portion of hangers 40 thus reducing the general cone angle of the assembly. A distributor with vanes 48 may be adjusted until the surfaces of the vanes are substantially vertical. When so adjusted the air is distributed so that the flow is vertical or almost vertical. A distributor adjusted in this manner is effective for increasing the distance which air will be thrown by a propeller fan. Air leaving a propeller fan moves in a helical path, or more accurately along the path of a translating spiral, and its velocity is therefore spent at a lesser distance from the fan than if there were straight line discharge. The vanes of my distributor are effective in converting the tangential momentum into translational momentum and in this way the distributor increases the distance that the fan throws the air. The distributor is most effective in converting this tangential momentum into translational momentum when the cone angle is small or the vanes are substantially vertical, however, this effect will be obtained although perhaps to a lesser degree when the cone angle is large, because the shape of the vanes provides passageways which lie in radial planes.

The construction of my diffuser allows it to be adjusted to different cone angles according to the requirements of the installation. And for each cone angle setting individual quadrants may be adjusted to an angle different from the general cone angle of the other quadrants.

While I have described the foregoing preferred embodiments of my invention, I contemplate that many changes may be made without departing from the scope or spirit of my invention, and I desire to be limited only by the claims.

I claim:

1. An air or gas distributor for directing the flow of air or gas from an outlet comprising a plurality of vanes having converging side edges and arranged about a central axis with the small ends of the vanes nearest the axis and with each converging side edge of each vane adjacent a converging side edge of an adjacent vane and means pivotally connecting each converging side edge of each vane to the adjacent converging side edge of the adjacent vane.

2. An air or gas distributor for directing the flow of air or gas from an outlet comprising a plurality of vanes having converging side edges and arranged about a central axis with the small ends of the vanes nearest said central axis and with each converging side edge of each vane adjacent a converging side edge of an adjacent vane and means pivotally connecting each converging side edge of each vane to the adjacent converging side edge of the adjacent vane, frame means adapted to be connected to an outlet, means on said frame means pivotally supporting said vanes with respect to said frame means.

3. An air or gas distributor for directing the flow of air or gas from an outlet comprising a plurality of vanes having converging side edges and arranged about a central axis with the small ends of the vanes nearest said axis and with each converging side edge of each vane adjacent the converging side edge of an adjacent vane, means pivotally connecting each vane to the next adjacent vane about an axis substantially coincident with the adjacent converging side edges of the vanes, and means for clamping at least some of said vanes in pivotally adjusted positions with respect to each other.

4. An air or gas distributor for directing the flow of air or gas from an outlet comprising a plurality of vanes having converging side edges and arranged about a central axis with their small ends nearest the axis and with each converging side edge of each vane adjacent to and substantially parallel with the adjacent converging side edge of an adjacent vane, and means pivotally connecting each converging side edge of each vane to the adjacent converging side edge of the adjacent vane, frame means constructed and arranged to be secured to an outlet, means pivotally mounted on said frame means and pivotally secured to said vanes to support said vanes with respect to said frame means.

5. An air or gas distributor for directing the flow of air or gas from an outlet comprising a plurality of vanes having converging side edges and arranged about a central axis with their small ends nearest the axis and with each converging side edge of each vane adjacent to and substantially parallel with the adjacent converging side edge of an adjacent vane, and means pivotally connecting each converging side edge of each vane to the adjacent converging side edge of the adjacent vane, frame means constructed and arranged to be secured to an outlet, means pivotally mounted on said frame means and pivotally secured to said vanes to support said vanes with respect to said frame means, and means for clamping at least some of said vanes in pivotally adjusted positions with respect to each other.

6. An air or gas distributor for directing the flow of air or gas from an outlet comprising a plurality of vanes having converging side edges and arranged about a central axis with the small ends of the vanes nearest the central axis and with each converging side edge of each vane adjacent a converging side edge of the next adjacent vane, means pivotally connecting each vane to the next adjacent vanes, a cross-shaped member having arms and being constructed and arranged to be secured to an outlet, a support member pivotally secured to each arm of the cross-shaped member and pivotally connected to a vane at its small end.

7. An air or gas distributor for directing the flow of air or gas from an outlet comprising a plurality of vanes having converging side edges and arranged about a central axis with their small ends nearest the axis and with their converging side edges lying substantially in planes radial to said central axis, means pivotally connecting each vane to the next adjacent vanes, frame means constructed and arranged to be secured to an outlet, means movably mounted on said frame means and pivotally secured to said vanes to support said vanes with respect to said frame means, each of said vanes being concave on the side facing the outlet.

8. An air or gas distributor for directing the flow of air or gas from an outlet comprising a plurality of vanes having converging side edges and arranged about a central axis with their small ends nearest the axis and with their converging side edges lying substantially in planes radial to said central axis, pivotal connections between each vane and the next adjacent vanes, the alternate pivotal connections of said pivotal connections having means for clamping the vanes in pivotally adjusted position, frame means adapted to be secured to an outlet and means movably mounted on said frame means and pivotally secured to the vanes at points near their small ends and near their converging side edges which are adjacent to the pivotal connections between said first recited alternate pivotal connections.

OTTO A. LABUS.

REFERENCES CITED

The following references are of record in the file of this patent:

UNITED STATES PATENTS

| Number | Name | Date |
|---|---|---|
| 915,178 | Hillyard | Mar. 16, 1909 |
| 1,178,088 | Maher | Apr. 4, 1916 |
| 1,535,846 | Heath et al. | May 5, 1925 |
| 1,735,760 | Howard | Nov. 12, 1929 |
| 1,791,790 | Burke | Feb. 10, 1931 |
| 1,926,778 | Kurth et al. | Sept. 12, 1933 |
| 2,097,078 | Peabody | Oct. 26, 1937 |
| 2,362,955 | Cantwell | Nov. 14, 1944 |
| 2,457,934 | Spieth | Jan. 4, 1949 |

FOREIGN PATENTS

| Number | Country | Date |
|---|---|---|
| 330,270 | Great Britain | June 4, 1930 |